Patented July 27, 1926.

1,593,934

UNITED STATES PATENT OFFICE.

JOHN FUHRMANN, OF BUFFALO, NEW YORK.

BUILDING BLOCK AND COMPOSITION OF SAME.

No Drawing.   Application filed September 20, 1922.   Serial No. 589,466.

This invention relates to a building block and a composition for making the same, which is more particularly designed for the production of a block which can be used either for interior or exterior walls of a building and also for use in building walls of furnaces, refrigerating compartments and other installations where the same is exposed to wide changes in temperature.

It is the object of this invention to produce a building block which is light and durable, fireproof, frost proof, water proof, and also unaffected by changes in temperature, so that it operates as a heat insulation and therefore useful as a covering for brine pipes of refrigerating apparatus, and also as a covering for pipes which conduct a heating agent, such as hot water or steam.

A further advantage of this composition for building blocks is that the same permits of applying a coat of plaster directly thereto without liability of the plaster cracking, and thus permits of finishing a wall with one coat instead of two coats as has been the practice heretofore.

In the manufacture of building blocks having the dimensions of four inches by twelve inches by twenty-four inches, in accordance with my invention, the following ingredients and the amounts of the same are employed:

| | |
|---|---|
| Cinders or slag | 12 pounds |
| Slag cement | 4 pounds |
| Lime | 2 pounds |
| Chromium ore of 12% purity | 2 pounds |
| Water | 2 quarts |

The cinders, cement and lime are employed in a dry state and the chromium ore is of dry powder form in the usual commercial condition and has a purity of twelve percent, in other words the ore contains about twelve percent of chromium and the remainder is not chromium but of a character suitable for union with the mass to form blocks having the advantages herein mentioned.

In the manufacture of the composition, preparatory to molding the same into a building block, the cinders are first purified by removing therefrom any coke or coal which may be present therein, so as to leave a residue of substantially pure grit. This grit, together with the slag cement, lime, chromium ore and water are then mixed together in the proportions above mentioned, for a period of about fifteen to twenty minutes, or until all of the ingredients are thoroughly intermingled and distributed throughout the entire plastic mass.

After being thus mixed, this composition while in a plastic state, is poured into a mold of the desired dimensions and allowed to set and dry without the use of any pressure on the same.

After the block of this composition has been dried, the same is ready for use in assembling with others of like composition for erecting either the inner or outer walls, floors or ceilings of a building, or for building the walls of a furnace, refrigerator, cold storage compartment or any other desired structure.

The cinders in the composition furnish the body of the block, the slag cement operates as a binder for holding the grains of the cinders constituting the body together, the lime in the composition permits of plastering directly against a wall made of such blocks and insures adhesion of the plaster to the wall, the chromium ore imparts to the block a fire proofing quality, and the water enables the above mentioned ingredients to be converted into a plastic mass so that the same adhere firmly to each other and form a solid and strong structure.

A building block made of this composition is very light, strong and durable and therefore very desirable where lightness is a prime consideration. It is also perfectly fire proof, it having been shown that a wall made of these blocks when heated on one side will be perfectly cool on its opposite side, thus indicating that this composition has practically no heat transmitting capacity, and therefore admirably suited for building fireproof vaults for use in banks and elsewhere, also for building cold rooms for refrigerating plants.

Owing to the poor temperature conducting capacity of this block, the same is also well suited as an insulating covering for the brine lines or pipes of refrigerating apparatus and the heat lines or pipes usually employed in buildings for conducting the heat agent, such as hot water or steam.

When used for building either interior or exterior walls of a building, it permits of dispensing with the usual wooden laths or studs on the wall, which have heretofore been necessary as a support for the priming and finishing coats of plaster. Instead of this, a single coat of plaster can be applied directly to the wall made of such blocks, which not only permits of finishing the wall with one coat and thus effects a considerable economy, but the same also saves the expense of employing wooden laths and studs, and renders the building fire proof by reason of the absence of these wooden elements. The plaster can be put on a wall of these blocks much more rapidly than onto wooden laths or studs by reason of the strong adhesion of the plaster to such a wall. Owing to the firm attachment of the plaster to this wall and the improved binding effect between the same, no cracks will develop in the plaster in response to changes in temperature, nor will the plaster become loose and fall off, as is frequently the case in plastered walls of ordinary construction.

Moreover, a wall built up of blocks of this composition is practically sound proof, inasmuch as it does not readily transmit sound waves or vibrations, and is thus well adapted for partitions between apartments of a dwelling.

A building block of this composition is practically immune to changes in temperature, it having been demonstrated that a block of the same when alternately heated and thrown into cold water is not affected in the least by such treatment, whereas a building block of ordinary construction would crack and break up into small pieces under similar conditions.

Furthermore, a block of this composition will stand high breaking and crushing strains, as has been demonstrated under tests, thereby rendering the same suitable for building purposes in which these qualities are desirable.

I claim as my invention:

A composition for building blocks comprising, approximately, twelve pounds of cinders, four pounds of slag cement, two pounds of lime, two pounds of ore containing about twelve percent of chromium, and two parts of water.

JOHN FUHRMANN.